(12) United States Patent
Lavergne et al.

(10) Patent No.: US 11,577,842 B2
(45) Date of Patent: Feb. 14, 2023

(54) AUTONOMOUS AIRCRAFT CABIN ENERGY RECOVERY MODULE AND CORRESPONDING METHOD

(71) Applicant: LIEBHERR-AEROSPACE TOULOUSE SAS, Toulouse (FR)

(72) Inventors: David Lavergne, Bouloc (FR); Fabrice Laborde, Toulouse (FR); Julien Daumas, Toulouse (FR); Patrick Favreau, Aussonne (FR)

(73) Assignee: LIEBHERR-AEROSPACE TOULOUSE SAS, Toulouse (FR)

( * ) Notice: Subject to any disclaimer, the term of this patent is extended or adjusted under 35 U.S.C. 154(b) by 1141 days.

(21) Appl. No.: 16/153,656

(22) Filed: Oct. 5, 2018

(65) Prior Publication Data
US 2019/0185167 A1    Jun. 20, 2019

(30) Foreign Application Priority Data
Oct. 5, 2017   (FR) ..................... 1759334

(51) Int. Cl.
*B64D 13/08*    (2006.01)
*B64D 13/06*    (2006.01)

(52) U.S. Cl.
CPC ............ *B64D 13/08* (2013.01); *B64D 13/06* (2013.01); *B64D 2013/0618* (2013.01); *B64D 2013/0648* (2013.01); *B64D 2013/0688* (2013.01)

(58) Field of Classification Search
CPC .... B64D 13/06; B64D 13/08; B64D 13/0618; B64D 13/0648; B64D 13/0688
See application file for complete search history.

(56) References Cited

U.S. PATENT DOCUMENTS 4,419,926 A * 12/1983 Cronin ................... B64D 13/06
454/74
5,967,461 A * 10/1999 Farrington ............. B64D 13/06
454/115

(Continued)

FOREIGN PATENT DOCUMENTS

EP    2524869 A1 * 11/2012 ............. B64D 13/06
FR    2894563 A1 *  6/2007 ........... B64D 13/006

*Primary Examiner* — Craig Kim
(74) *Attorney, Agent, or Firm* — CRGO Global; Steven M. Greenberg

(57) ABSTRACT

The invention relates to a module (23) for recovery of energy of an aircraft cabin (5) comprising at least one air outlet (16) from the cabin and at least one fresh air inlet (15) into the cabin, the said module comprising: a turbine engine (30) comprising a compressor (31) and a turbine (32) mechanically coupled to one another; a cabin-air recovery duct (42) designed to be able to link the air outlet (16) from the cabin and the said turbine (32); a cabin-air injection duct (41) designed to be able to link the compressor (31) and fresh air inlet (15) into the cabin; an emergency duct (43) designed to be able to link a high-pressure air source and the said turbine (32); a control unit (25) configured to be able, according to predetermined operational conditions, to activate either a routine mode, in which the said turbine (32) is exclusively supplied by the air evacuated from the cabin (5), or an emergency mode, in which the said turbine (32) is exclusively supplied by the air provided by the high-pressure air source.

12 Claims, 2 Drawing Sheets

(56) References Cited

U.S. PATENT DOCUMENTS

Figure 1:
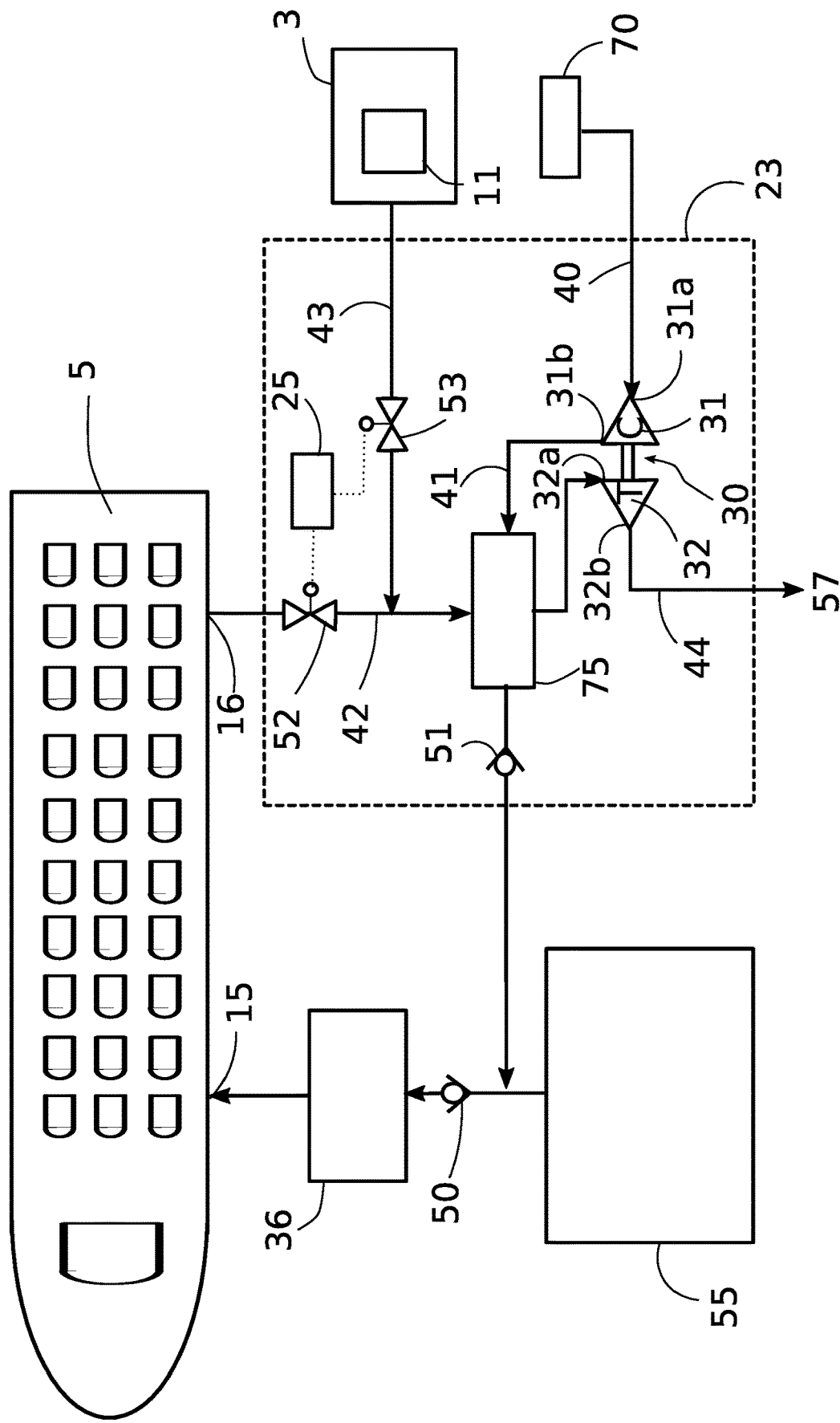

| | | | |
|---|---|---|---|
| 6,216,981 B1 * | 4/2001 | Helm .................... | B64D 13/06 454/76 |
| 10,752,365 B2 * | 8/2020 | Galzin ................... | B64D 13/08 |
| 2016/0009409 A1 | 1/2016 | Rideau | |
| 2016/0083100 A1 | 3/2016 | Bammann et al. | |

* cited by examiner

AUTONOMOUS AIRCRAFT CABIN ENERGY RECOVERY MODULE AND CORRESPONDING METHOD

CROSS-REFERENCE TO RELATED APPLICATIONS

This application claims priority under 35 U.S.C. § 119(a) to French Patent Application Number 1759334, filed Oct. 5, 2017, the entire teachings of which are incorporated herein by reference.

1. TECHNICAL FIELD OF THE INVENTION

The invention relates to a module and a process for recovery of energy of an aircraft cabin. The invention likewise relates to an environmental control system for an aircraft comprising such a module, and extends to an aircraft equipped with such an environmental control system.

2. TECHNOLOGICAL BACKGROUND

Throughout the text, the term "cabin" refers to any interior space of an aircraft, for which the pressure and/or temperature of the air must be controlled. This can be a cabin for passengers, the cockpit, a hold, and, in a generalised manner, any area of the aircraft that requires air at a controlled pressure and/or temperature. The term "turbine" refers to a rotating device intended to use the kinetic energy of the air to cause a shaft supporting the blades of the turbine to turn. The term "compressor" refers to a rotating device intended to increase the pressure of the air that it receives on the inlet side.

An environmental control system of an aircraft cabin is known to comprise a device for the bleed of compressed air from at least one compressor of a propulsion engine of the aircraft and an air cycle turbine engine comprising at least one compressor and one turbine, the compressor being supplied air by the compressed air bleed device after passing through a flow or pressure control valve, and the turbine comprising an air outlet supplying the cabin with air, referred to as fresh air, at controlled temperature and flow. The system furthermore includes various heat exchangers, control valves and a water extraction loop.

The air bleed from the propulsion engines of the aircraft increases the fuel consumption. Moreover, various solutions have been proposed in order to limit as much as possible this air bleed from propulsion engines.

One of the solutions that has already been proposed consists in recovery of a part of the energy of the air evacuated from the cabin to supply a turbine of a turbine engine that is mechanically linked to a compressor intended to compress ambient air that is bled outside of the aircraft. In so doing, the energy of the cabin is used to supply compressed air to the air conditioning system, by means of the turbine engine, thereby partially removing the need to bleed air from a propulsion engine.

One of the drawbacks that remains with such a system concerns the phases of flight during which the outlet flow from the cabin is no longer sufficient to supply the turbine of the turbine engine or when the pressure difference between the cabin and the ambient environment is insufficient from an energy point of view. In such a case, the recovery of the cabin energy is not operational and the mechanisms dedicated to this recovery of energy then become a useless burden that impacts the energy performance of the aircraft.

The inventors have therefore sought to propose a new solution to overcome the drawbacks of the prior art solutions.

3. PURPOSES OF THE INVENTION

The invention intends to provide an autonomous module for recovery of energy which overcomes the drawbacks of the prior art solutions.

In particular, the invention intends to provide an autonomous module for recovery of energy which remains operational in the phases of flight in which the outlet flow of the cabin is no longer sufficient to supply the turbine of the turbine engine or when the pressure difference between the cabin and the ambient environment is not sufficient from an energy point of view.

The invention also intends to provide, in at least one embodiment, an autonomous module for recovery of energy which allows for the at least partial compensation for a failure of an air conditioning pack.

The invention also intends to provide, in at least one embodiment, an autonomous module for recovery of energy which can be installed on an aircraft, without requiring substantial modifications to the pre-existing air conditioning system.

The invention also intends to provide, according to at least one embodiment, an autonomous module which allows for an increase in the carrying capacity of the aircraft upon which it is installed, all the while maintaining the pre-existing air conditioning system.

The invention also intends to provide a process for recovery of energy of an aircraft cabin.

The invention also intends to provide an environmental control system of an aircraft cabin associated with a module for recovery of energy according to the invention.

The invention also intends to provide an aircraft equipped with an environmental control system according to the invention.

4. DISCLOSURE OF THE INVENTION

To this end, the invention relates to a module for recovery of energy of an aircraft cabin comprising at least one air outlet for air from the cabin—in particular an exhaust air outlet—and at least one fresh air inlet into the cabin, which inlet is designed to be fed by an environmental control system of the cabin, the said module comprising:
  a turbine engine comprising at least one compressor provided with an air inlet and an air outlet, and at least one turbine provided with an air inlet and an air outlet, mechanically coupled to one another,
  a duct, called cabin-air recovery duct, designed to be able to link in fluid communication an outlet for air from the cabin—in particular an exhaust air outlet—and an air inlet of the said turbine, the said cabin-air recovery duct being moreover equipped with an air flow control valve, called recovery valve,
  a duct, called compressor supply duct, designed to be able to link in fluid communication an outside-air bleed device and an air inlet of the compressor,
  a duct, called cabin-air injection duct, designed to be able to link in fluid communication an air outlet of the compressor and a fresh air inlet of the cabin,
  a duct, called emergency duct, designed to be able to link in fluid communication a source of high-pressure air and an air inlet of the said turbine of the said turbine engine, the said emergency duct moreover being equipped with an air pressure control valve, called emergency valve, a control unit of the said recovery valve and of the said emergency valve, configured in such a way as to be able, according to predetermined operational conditions, to activate at least one of the following modes of operation:

a mode, called routine mode, in which the said recovery valve is open and the said emergency valve is closed, in such a manner that the said turbine is exclusively supplied by the air—in particular the exhaust air—evacuated from the cabin, a mode, called emergency mode, in which the said recovery valve is closed and the said emergency valve is open, in such a manner that the said turbine is exclusively supplied by the air which is supplied by the high-pressure air source.

A module according to the invention therefore allows for at least two modes of operation to be offered: a routine mode in which the turbine of the turbine engine is supplied by the air evacuated from the cabin, which allows for the recovery of the power of the cabin air to compress an outside air bleed in view of injecting it into the cabin, and an emergency mode, in which the turbine of the turbine engine is supplied by air from a high-pressure source, which allows an outside air bleed to be compressed in view of injecting it into the cabin, including when the cabin outlet flow is no longer sufficient to supply the turbine of the turbine engine or when the pressure difference between the cabin and the ambient environment is insufficient from an energy point of view.

A module according to the invention therefore allows for operation in all phases of flight. The mechanisms dedicated to the recovery of energy can therefore be used for the air conditioning, including when the recovery of energy of the cabin is no longer possible.

The module according to the invention likewise allows for an increase in the carrying capacity of the aircraft upon which it is fitted, without modifying the pre-existing air conditioning system, by allowing a surplus supply of fresh air to the cabin.

The module according to the invention is autonomous and can be connected in parallel with a pre-existing air conditioning system (likewise referred to as an environmental control system). The module according to the invention thus forms a plug and play module. In order to make the module operational, it is merely necessary to connect the recovery, emergency, compressor supply and cabin-air injection ducts to the air outlet from the cabin and the fresh air inlet into the cabin, and to provide the pre-determined operational conditions to the control unit (which are, for example, derived from the control logic of the air conditioning system of the aircraft) in order to be able to control the recovery and emergency valves as required. Of course, "air outlet from the cabin" or "exhaust air outlet from the cabin" and "fresh air inlet into the cabin" should be understood as means for fluid communication between the cabin and the module. In particular, the fresh air inlet into the cabin advantageously comprises a duct linked to the air conditioning system to which the cabin-air injection duct is connected, advantageously upstream of a mixing chamber in such a manner as to be able to mix the flow of air provided by the module for recovery of energy according to the invention and the flow of air provided by the air conditioning system of the aircraft.

In the routine mode, the recovery valve is open (and the emergency valve is closed) and the turbine receives a flow of air at a pressure difference between the pressure of the evacuated air from the cabin and the outside air pressure. This turbine drives the compressor, which has the role of increasing the pressure of the air bleed from outside, for example, by means of an air scoop, and generating a flow of air which is injected into the cabin, after possible mixing with the flow of fresh air provided by the air conditioning system of the aircraft.

In the emergency mode, the emergency valve is open (and the recovery valve is closed) and the turbine is driven by a high-pressure air flow derived from the source of high-pressure air. This source of high-pressure air is advantageously formed by an air bleed device of a compressor of a propulsion engine of the aircraft. This high-pressure air is better known as the air bleed. The high-pressure air source can likewise be formed by an air bleed from an auxiliary engine (better known as the APU or Auxiliary Power Unit) or by an air bleed from a fan of an engine which is subsequently compressed. No matter which source of the high-pressure air is used for the emergency mode, the turbine drives the compressor in the same manner as for the routine mode. Said compressor then also has the role of increasing the pressure of the air bleed from outside, for example by means of the air scoop, and of generating a flow of air which is injected into the cabin, after possible mixing with the flow of fresh air provided by the air conditioning system of the aircraft.

Advantageously and according to the invention, the module moreover comprises a heat exchanger that is designed to ensure heat exchanges between the air flow conveyed by the said cabin-air recovery duct and the air flow conveyed by the said cabin-air injection duct, and the emergency duct leads into the said cabin-air recovery duct downstream of the said recovery valve and upstream of the said heat exchanger.

According to this advantageous variant, the heat exchanger permits the recovery of heat energy at the outlet from the compressor in order to increase the temperature, and thus the energy at the turbine inlet. The inventors have determined that this architecture allows for recovery in the order of 15% additional power. Moreover, this heat exchanger allows for an outlet air temperature from the module for recovery of energy which approaches that of the cabin temperature.

Advantageously and according to the invention, the said control unit is configured to be able, according to predetermined operational conditions, to activate a mode, called intermediary mode, in which the recovery and emergency valves are jointly controlled upon opening, in such a manner that the said turbine is jointly supplied by the air evacuated from the cabin and the air provided by the high-pressure air source.

In the intermediary mode, the valves are jointly controlled—in particular regulated—in such a manner as to be able to supply the turbine both by means of a cabin recovery air flow and by a flow of air derived from the high-pressure source. In the same manner as for the other modes of operation, the turbine then drives the compressor, which also has the role of increasing the pressure of the air bleed from outside, for example by means of the air scoop, and to generate a flow of air which is injected into the cabin, after possible mixing with the flow of fresh air provided by the air conditioning system of the aircraft.

Advantageously and according to the invention, the pre-determined operational conditions allow for the definition of the operation mode of the module depending on the environmental control system of the aircraft cabin.

A module according to this variant allows for the at least partial compensation of the loss of an air conditioning pack by shifting to the emergency mode and by directly providing the necessary fresh air to the cabin as soon as the predetermined operational conditions which are dependent on the environmental control system of the aircraft reveal, for example, a failure of the pack. The module according to the invention therefore acts as an emergency pack in the event of a failure of the main air conditioning pack.

Advantageously and according to the invention, the module comprises a three-way valve that forms both the said recovery valve and the said emergency valve.

A module according to this variant allows for the limitation of the quantity of items of equipment by only providing one single three-way valve in the stead and in the place of the recovery valve and of the emergency valve. This in particular allows the module according to the invention to be made lighter and for its footprint to be reduced. Moreover, this allows for the facilitation of the control actions of the valve.

Advantageously and according to the invention, the said emergency duct is equipped with a pressure regulation device in such a manner as to be able to adapt the pressure of the air provided to the said turbine to the technical specifications of the said turbine.

A module according to this variant allows the adaptation of the pressure of the air provided to the turbine of the turbine engine, in the emergency mode, no matter which turbine of the turbine engine is used.

Advantageously and according to the invention, the module likewise comprises a duct, called turbine outlet duct, that is designed to be able to link in fluid communication the said air outlet of the turbine of the turbine engine and an air outlet to the outside of the aircraft in such a manner as to be able to expel the expanded air to the outside of the aircraft.

A module according to this variant allows for the evacuation of the expanded air by the turbine towards the outside of the aircraft.

According to another variant, the turbine outlet duct leads into a dynamic-air circulation channel, better known under the name air RAM, of the environmental control system of the cabin through one or more heat exchangers.

Advantageously and according to the invention, the turbine engine is a turbine engine having at least two parallel turbine stages.

The invention likewise relates to a process for recovery of energy of an aircraft cabin comprising at least one outlet for air from the cabin—in particular an exhaust air outlet—and at least one fresh air inlet into the cabin, designed to be supplied by an environmental control system of the cabin, wherein:
  an inlet of air of a turbine of a turbine engine is linked in fluid communication to an outlet for air from the cabin—in particular an exhaust air outlet—by means of a duct, called cabin-air recovery duct, equipped with an air flow control valve, called a recovery valve,
  an air inlet of a compressor of the said turbine engine is linked in fluid communication to an outside-air bleed device by means of a duct, called a compressor supply duct,
  an air outlet of the said compressor is linked in fluid communication to a fresh air inlet of the cabin by means of a duct, called cabin-air injection duct,
  a high-pressure air source is linked in fluid communication to the said air inlet of the said turbine of the said turbine engine by means of a duct, called emergency duct, equipped with an air pressure control valve, called emergency valve,
  the said recovery valve and the said emergency valve are controlled to be able to ensure, according to predetermined operational conditions, at least the following modes of operation:
    a mode, called routine mode, in which the said recovery valve is open and the said emergency valve is closed, in such a manner that the said turbine is exclusively supplied by the air—in particular exhaust air—evacuated from the cabin,
    a mode, called emergency mode, in which the said recovery valve is closed and the said emergency valve is open, in such a manner that the said turbine is exclusively supplied by the air provided by the high-pressure air source.

A process according to the invention is advantageously implemented by a module for recovery of energy according to the invention, and a module for recovery of energy according to the invention advantageously implements a process according to the invention. Furthermore, the advantages and technical effects of the module according to the invention are likewise obtained by a process according to the invention. In particular, a process according to the invention allows at least two modes of operation to be offered: a routine mode, in which the turbine of the turbine engine is supplied by the air evacuated from the cabin, which allows for the recovery of the power of the air from the cabin to compress air bleed from outside in view of injecting it into the cabin, and an emergency mode, in which the turbine of the turbine engine is supplied by air derived from a high-pressure source, which allows for the compression of air bleed from outside in view of injecting it into the cabin, including when the cabin outlet flow is no longer sufficient to supply the turbine of the turbine engine or when the pressure difference between the cabin and the ambient environment is insufficient from an energy point of view.

Advantageously and according to the invention, heat exchanges are ensured between the air flow conveyed by the said cabin-air recovery duct and the air flow conveyed by the said cabin-air injection duct by means of a heat exchanger, and the said emergency duct leads into the said cabin-air recovery duct upstream of the said heat exchanger and downstream of the said emergency valve.

According to this advantageous variant, the heat exchanges ensured by the heat exchanger allow for the recovery of the heat energy at the outlet of the compressor to increase the temperature and therefore the energy at the turbine inlet.

The invention likewise relates to an environmental control system of an aircraft cabin comprising at least one outlet for air from the cabin—in particular an exhaust air outlet—and at least one fresh air inlet into the cabin, the said system comprising at least one air conditioning pack designed to provide conditioned air to a fresh air inlet of the cabin.

The environmental control system according to the invention is characterised in that it comprises an air recovery module according to the invention.

In this way, for the same outlet flow from the air conditioning pack, the system according to the invention makes it possible to limit the air bleed from the compressor of the aircraft engine, and therefore limit the fuel consumption. Moreover, the air recovery module not only participates in limiting the air bleed from the propulsion engines in the routine mode, it likewise allows for the at least partial compensation, in the emergency mode, for a conditioning pack in the event of a failure thereof, as previously explained.

The invention likewise relates to an aircraft comprising at least one propulsion engine and a cabin, characterised in that it comprises an environmental control system, according to the invention, for this cabin.

The invention likewise relates to a module and to a process for recovery of cabin energy, to an environmental control system, and to an aircraft that are characterised in combination by all or some of the features mentioned above or hereafter.

5. LIST OF THE FIGURES

Figure 2:
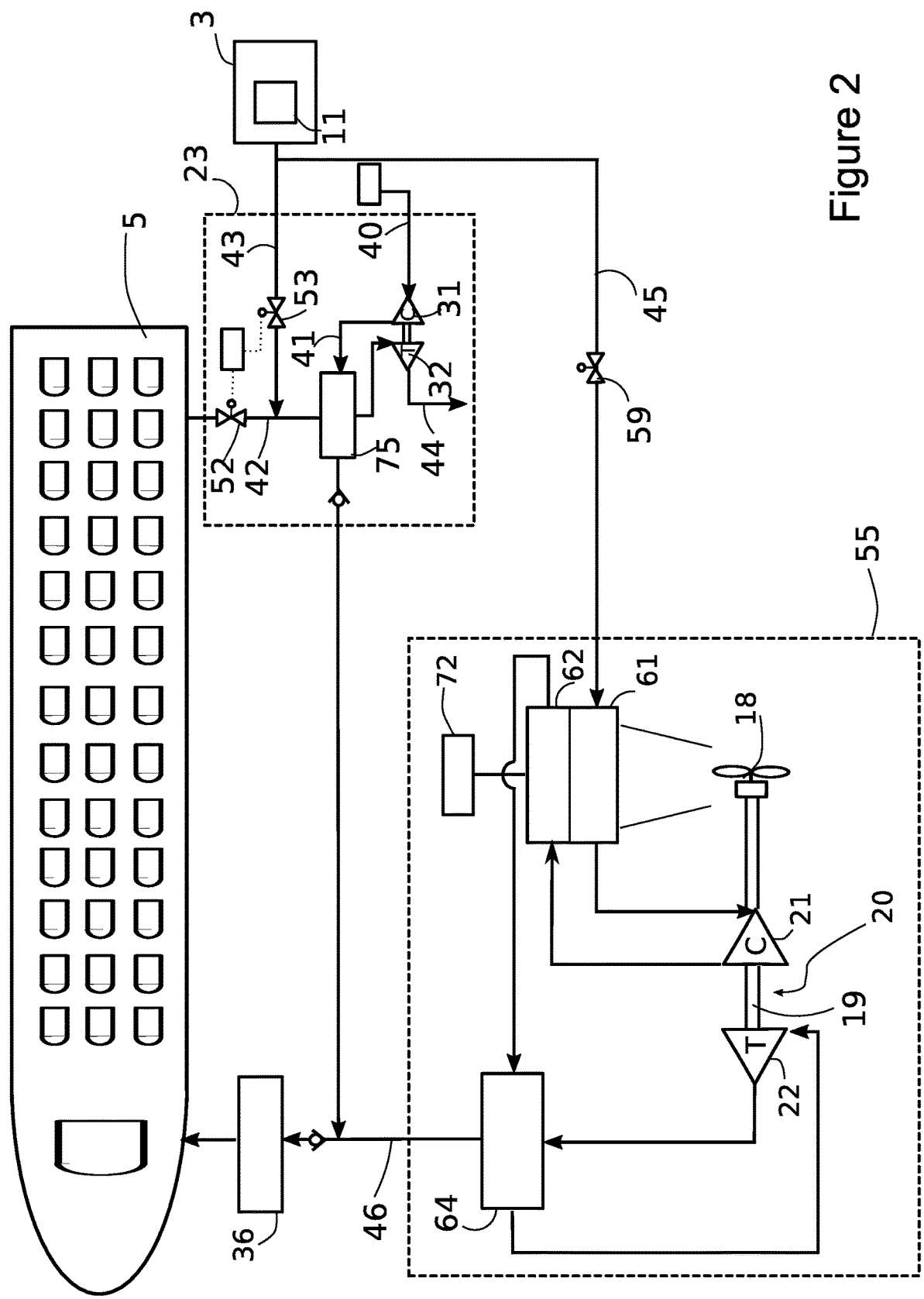

Other objectives, features and advantages of the invention will be apparent upon reading the following description, which is provided merely as a non-limiting example and refers to the appended figures, in which:

FIG. 1 is a schematic view of a module for recovery of energy according to an embodiment of the invention, FIG. 2 is a schematic view of an environmental control system according to an embodiment of the invention.

6. DETAILED DESCRIPTION OF AN EMBODIMENT OF THE INVENTION

FIG. 1 schematically represents an aircraft comprising a passenger cabin 5, and at least one main engine 3. This main engine 3 intended for the propulsion of the aircraft comprises, for example, a compressor 11 and a turbine (not represented in FIG. 1).

FIG. 1 likewise illustrates an air conditioning pack 55, better known by the acronym ECS. This conditioning pack 55 can have various embodiments, one of which is schematically represented in FIG. 2. The air conditioning pack 55 that is schematically represented in FIG. 2 is a pack, the architecture of which uses predominantly pneumatic means. It should nonetheless be noted that the invention likewise relates to an electric air conditioning pack or to a hybrid electro-pneumatic air conditioning pack.

FIG. 1 illustrates a module 23 for recovery according to an embodiment of the invention. This module 23 for recovery of energy according to the invention comprises a turbine engine 30 comprising a compressor 31 and a turbine 32 that are mechanically coupled to one another.

The compressor 31 comprises an air inlet 31a linked in fluid communication to an outside air scoop 70 by means of a compressor supply duct 40, and an air outlet 31b linked in fluid communication to a fresh air inlet 15 into the cabin 5 by means of a cabin-air injection duct 41.

The turbine 32 comprises an air inlet 32a linked in fluid communication to an air outlet 16 from the cabin 5 by means of a cabin-air recovery duct 42. This duct 42 is equipped with an air flow control valve, called recovery valve 52. This recovery valve 52 can be an air flow control valve.

The air inlet 32a of the turbine is likewise linked in fluid communication to the said compressor 11 of the propulsion engine 3 by means of an emergency duct 43. This emergency duct 43 is equipped with an air pressure control valve, called emergency valve 53. This emergency valve 53 is, for example, associated with a pressure sensor housed in the emergency valve in such a manner as to be able to provide pressure measurements downstream of the valve 53 allowing the emergency valve to regulate the air pressure provided to the turbine of the turbine engine.

The turbine 32 likewise comprises an air outlet 32b linked in fluid communication to an outside air outlet 57 by means of a turbine outlet duct 44.

The module 23 for recovery of energy likewise comprises a heat exchanger 75 designed to ensure heat exchanges between the flow of air conveyed by the cabin-air recovery duct 42 and the flow of air conveyed by the cabin-air injection duct 41. This heat exchanger 75, better known as an intercooler, allows for the recovery of the heat energy at the outlet from the compressor 31 to increase the temperature and thus the energy at the inlet to the turbine 32. Moreover, this heat exchanger 75 allows for an air temperature at the outlet from the module 23 for recovery of energy which approaches the temperature of the cabin 5 air. In other words, the heat exchanger 75 allows for the auto-stabilisation of the temperature of the air compressed by the compressor 31.

The module 23 for recovery of energy lastly comprises a control unit 25 for the recovery valve 52 and the emergency valve 53.

This control unit 25 can be of any type and depends on the type of control valve used.

The control unit 25 is configured in order to be able to control the opening/closing of each of the two valves in such a manner to be able to control the supply of the turbine 32, either by the air evacuated from the cabin (routine mode), or by the high-pressure air provided by the compressor 11 of the propulsion engine 3 of the aircraft (emergency mode).

The control unit can likewise control the simultaneous opening of the two valves in such a manner as to supply the turbine 32 at the same time with air evacuated from the cabin and with the high-pressure air derived from the compressor 11 of the propulsion engine.

The module 23 according to the embodiment of FIG. 1 likewise comprises a flap 51 arranged on the duct 41 for injecting air into the cabin.

A module 23 according to the invention is autonomous in such a manner that it can be directly connected between the air outlet (16) from the cabin and the fresh air inlet 15 into the cabin. Preferably, the air outlet (16) and the air inlet 15 are each equipped with a controllable valve (not represented in the figures). These valves are generally provided on all aircrafts in order to allow the renewal of the air in the cabin 5 and the control of the predominant pressure in the cabin. These cabin inlet and outlet valves are controlled by a logic for controlling the pressurisation of the cabin 5 based upon the different flight phases and the conditions of use of the cabin, in particular the number of passengers in the cabin.

Preferably, the module 23 is associated with the air conditioning pack 55 of the aircraft. To this end, the supply duct 41 of the cabin supplies a mixing chamber 36 which is likewise supplied by the air provided by the air conditioning pack 55. This mixing chamber 36 allows the receipt of the air flows provided on the one hand by the air conditioning pack 55 and, on the other hand, by the cabin-module 23 for recovery of energy, and the mixing thereof prior to their introduction into the cabin 5. This mixing chamber 36 is supplied by a duct which receives the two air flows. This duct preferably comprises a check valve 50.

FIG. 2 represents the air conditioning pack 55 in a more detailed manner and, in a less detailed manner, the module 23 for recovery of cabin-energy.

An air conditioning pack, better known as an ECS or Environmental Control System, can be made up of an assembly of mechanisms which are enclosed in a casing or housing and have air inlet and outlet connection ports and a channel for the circulation of dynamic air, better known by the term air RAM, by means of one or more heat exchangers. Such a pack can be the object of numerous embodiment variants which are compatible with a module for recovery of energy according to the invention. FIG. 2 schematically illustrates one of the possible embodiment variants.

Such a pack comprises, and as represented in FIG. 2, at least one air cycle turbine engine 20 which comprises, according to the embodiment of FIG. 2, a compressor 21 and a turbine 22 linked to one another by a rotating shaft 19. The turbine engine likewise comprises a fan 18 configured so as to ensure the circulation of dynamic air, known by the acronym RAM, through heat exchangers. According to the embodiment shown in the figure, the fan 18 is fitted to the rotating shaft 19 linking the compressor 21 and the turbine 22. According to another embodiment, the fan can be rotatably driven by other means, such as, for example, electrical means.

According to a variant that is not represented in the figures, the outlet duct 44 of the turbine of the module 23 leads into a dynamic-air circulation channel of the air conditioning pack 55.

The pack likewise comprises a water extraction loop 64 (not represented in detail for the purpose of clarity) that is well known to the person skilled in the art.

The air conditioning pack 55 is supplied with air bleed from the compressor 11 of the engine 3 by means of an air bleed duct 45, and the pack 55 supplies the cabin 5 by means of a cabin inlet duct 46. The bleed duct 45 is equipped with a valve 59 controlled by a control logic of the air conditioning pack 55 in such a manner to be able to adapt the air flow and/or pressure provided to the pack as required.

A first circuit of an air/air heat exchanger 62 is located between the outlet of the compressor 21 and the inlet of the turbine 22 in such a manner as to be able to cool the compressed and reheated air delivered by the compressor 21 prior to its introduction into the air inlet of the turbine 22. Downstream of the heat exchanger 62, the compressed and cooled flow of air passes into a water extraction loop 64. This water extraction loop 64 comprises, for example, a reheater made up of an air/air heat exchanger, a condenser likewise made up of an air/air heat exchanger and a water extractor. The cold air expanded at the outlet of the turbine 22 passes through the condenser of the water extraction loop 64 to cool the air flow upstream of the turbine 22, then supplies the mixing chamber 36.

The heat exchanger 62 comprises a second circuit through which the air at dynamic pressure originating from at least one bleed air vent 72 passes to cool the compressed air reheated between the compressor 21 and the turbine 22.

Moreover, a first circuit of an air/air cooling heat exchanger 61 is located between the inlet of the air conditioning system 55 and the air inlet of the compressor 21. The air at dynamic pressure originating from the bleed air vent 72 passes through the second circuit of this heat exchanger 61. This heat exchanger 61 thereby allows the cooling of the air entering the air conditioning pack 55 prior to its input into the compressor 21 of the air cycle turbine engine 20. As indicated previously, according to an embodiment that is not represented, the turbine outlet duct 44 leads into the circulation channel for the air at dynamic pressure originating from the bleed air vent 72.

The circulation of air in the second circuits of the heat exchangers 61, 62 is ensured by the fan 18.

Each heat exchanger 61, 62 allows a transfer of heat between its first circuit and its second circuit depending on the difference of temperature of the air flows respectively passing through each circuit.

An environmental control system according to the embodiment of FIG. 2 thereby allows the supply of air at a temperature and pressure that are controlled by the air conditioning pack 55, while at the same time limiting the bleed on the engine 3 of the aircraft due to the presence of the module 23 for recovery of cabin-energy and its ability to operate in a routine mode in which it provides air at controlled pressure and temperature as a complement to the air provided by the air conditioning pack 55.

Moreover, the invention makes it possible to at least partially compensate for a possible failure of the air conditioning pack by providing an emergency mode in which the control unit 25 of the module 23 controls the opening of the emergency valve 53 to supply the turbine 32 in such a manner as to drive the compressor 31 of the turbine engine 30, allowing air to be supplied at controlled temperature and pressure to the mixing chamber 36.

An aircraft according to the invention can comprise one single engine 3 and one single environmental control system according to the invention. As a variant, the aircraft comprises two propulsion engines and a plurality of environmental control systems according to the invention, or one single environmental control system for a plurality of engines. Likewise, the aircraft can comprise one single cabin-module for recovery of energy for one or more environmental control systems or one module for recovery of energy per environmental control system according to the invention.

The invention claimed is:

1. A module for recovery of energy of an aircraft cabin comprising at least one air outlet from the cabin and at least one fresh air inlet into the cabin, designed to be supplied by an environmental control system of the cabin, the module comprising:
    a turbine engine comprising at least one compressor equipped with an air inlet and an air outlet, and at least one turbine equipped with an air inlet and an air outlet which are mechanically coupled to one another,
    a duct, called cabin-air recovery duct, designed to be able to link in fluid communication an air outlet from the cabin and an air inlet of the said turbine, the said cabin-air recovery duct moreover being equipped with an air flow control valve, called recovery valve,
    a duct, called compressor supply duct, designed to be able to link in fluid communication an outside-air bleed device and an air inlet of the compressor,
    a duct, called cabin-air injection duct, designed to be able to link in fluid communication an air outlet of the compressor and a fresh air inlet into the cabin,
    a duct, called emergency duct, designed to be able to link in fluid communication a high-pressure air source and an inlet of the turbine, the said emergency duct moreover being equipped with an air pressure control valve, called emergency valve, a control unit for the said recovery valve and the said emergency valve, configured, according to predetermined operational conditions, to be able to activate at least one of the following modes of operation:
    a routine mode, in which the said recovery valve is open and the said emergency valve is closed, in such a manner that the said turbine is exclusively supplied by the air evacuated from the cabin,
    an emergency mode, in which the said recovery valve is closed and the said emergency valve is open, in such a manner that the said turbine is exclusively supplied by the air provided by the high-pressure air source.

2. The module according to claim 1, further comprising a heat exchanger designed to ensure heat exchanges between the air flow conveyed by the said cabin-air recovery duct and the air flow conveyed by the said cabin-air injection duct, and in that the said emergency duct leads into the said cabin-air recovery duct downstream of the said recovery valve and upstream of the said heat exchanger.

3. The module according to claim 1, said control unit is configured to be able to activate, according to predetermined operational conditions, an intermediary mode, in which the recovery valve and emergency valve are jointly controlled upon opening, in such a manner that the said turbine is jointly supplied by the air evacuated from the cabin and the air provided by the high-pressure air source.

4. The module according to claim 1 wherein the predetermined operational conditions enable a definition of the routine and emergency modes of operation of the said module, depending on the said environmental control system of the aircraft cabin.

5. The module according to claim 1 further comprising a three-way valve that simultaneously forms the said recovery valve and the said emergency valve.

6. The module according to claim 1 wherein the high-pressure air source is an air bleed device of a compressor of a propulsion engine of the aircraft.

7. The module according to claim 1 wherein the emergency duct is equipped with a pressure regulation device in such a manner to adapt the pressure of the air supplied to the said turbine, to the technical specifications of the said turbine.

8. The module according to claim 1 further comprising a duct, called a turbine outlet duct, designed to be able to link in communication an air outlet of the turbine of the turbine engine and an air outlet outside of the aircraft in such a manner to be able to expel the expanded air outside of the aircraft.

9. The module according to claim 1 the said turbine engine is a turbine engine that has at least two turbine stages in parallel.

10. A process for recovery of energy of an aircraft cabin comprising at least one air outlet from the cabin and at least one fresh air inlet into the cabin, which inlet is designed to be supplied by an environmental control system of the cabin, the processing comprising linking an air inlet of a turbine of a turbine engine in fluid communication to an outlet for air from the cabin by means of a duct, called cabin-air recovery duct, equipped with an air flow control valve, called recovery valve, linking an air inlet of a compressor of the said turbine engine in fluid communication to an outside air bleed device by means of a duct, called compressor supply duct, linking an air outlet of the said compressor on fluid communication to a fresh air inlet of the cabin by means of a duct, called cabin-air injection duct, linking a high-pressure air source in fluid communication to the said air inlet of the turbine by means of a duct, called emergency duct , equipped with an air pressure control valve, called emergency valve, wherein the recovery valve and the said emergency valve are controlled to be able, according to predetermined operational conditions, to ensure at least the following modes of operation:

a routine mode, in which the said recovery valve is open and the said emergency valve is closed, in such a manner that the said turbine is exclusively supplied by the air evacuated from the cabin, an emergency mode, in which the said recovery valve is closed and the said emergency valve is open, in such a manner that the said turbine is exclusively supplied by the air provided by the high-pressure air source.

11. The process according to claim 10, wherein that heat exchanges are ensured between the air flow conveyed by the said cabin-air recovery duct and the air flow conveyed by the said cabin-air injection duct by means of a heat exchanger, and in that the said emergency duct leads into the said cabin-air recovery duct downstream of the said recovery valve and upstream of the said heat exchanger.

12. An environmental control system of an aircraft cabin comprising at least one air outlet from the cabin and at least one fresh air inlet into the cabin, the said system comprising at least one air conditioning pack designed to provide conditioned air to a fresh air inlet of the cabin, the system further comprising a module for recovery of energy the module comprising:

a turbine engine comprising at least one compressor equipped with an air inlet and an air outlet, and at least one turbine equipped with an air inlet and an air outlet which are mechanically coupled to one another, a duct, called cabin-air recovery duct, designed to be able to link in fluid communication an air outlet from the cabin and an air inlet of the said turbine, the said cabin-air recovery duct moreover being equipped with an air flow control valve, called recovery valve, a duct, called compressor supply duct, designed to be able to link in fluid communication an outside-air bleed device and an air inlet of the compressor, a duct, called cabin-air injection duct, designed to be able to link in fluid communication an air outlet of the compressor and a fresh air inlet into the cabin, a duct, called emergency duct, designed to be able to link in fluid communication a high-pressure air source and an inlet of the turbine, the said emergency duct moreover being equipped with an air pressure control valve, called emergency valve, a control unit for the said recovery valve and the said emergency valve, configured, according to predetermined operational conditions, to be able to activate at least one of the following modes of operation:

a routine mode, in which the said recovery valve is open and the said emergency valve is closed, in such a manner that the said turbine is exclusively supplied by the air evacuated from the cabin, a emergency mode, in which the said recovery valve is closed and the said emergency valve is open, in such a manner that the said turbine is exclusively supplied by the air provided by the high-pressure air source.

* * * * *